United States Patent
Yang et al.

(10) Patent No.: US 11,747,960 B2
(45) Date of Patent: *Sep. 5, 2023

(54) EFFICIENTLY AUGMENTING IMAGES WITH RELATED CONTENT

(71) Applicant: Google LLC, Mountain View, CA (US)

(72) Inventors: Charles Yang, Fremont, CA (US); Louis Wang, San Francisco, CA (US); Charles J. Rosenberg, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,695

(22) Filed: Dec. 28, 2021

(65) Prior Publication Data

US 2022/0121331 A1 Apr. 21, 2022

Related U.S. Application Data

(63) Continuation of application No. 16/069,071, filed as application No. PCT/US2017/051333 on Sep. 13, 2017, now Pat. No. 11,231,832.

(51) Int. Cl.
*G06F 17/00* (2019.01)
*G06F 3/0482* (2013.01)
(Continued)

(52) U.S. Cl.
CPC ........ *G06F 3/0482* (2013.01); *G06F 3/04845* (2013.01); *G06F 16/583* (2019.01);
(Continued)

(58) Field of Classification Search
CPC .. G06F 3/0482; G06F 3/04845; G06F 16/583; G06F 16/951; G06F 40/205; G06F 2203/04803; G06F 2203/04806
See application file for complete search history.

(56) References Cited

U.S. PATENT DOCUMENTS 7,128,270 B2   10/2006   Silverbrook et al.
8,942,921 B1   1/2015    Unnikrishnan
(Continued)

FOREIGN PATENT DOCUMENTS

CN   104246678   12/2014
CN   105122242   12/2015
(Continued)

OTHER PUBLICATIONS

International Preliminary Report on Patentability for Application No. PCT/US2017/051333, dated Mar. 17, 2020, 9 pages.
(Continued)

*Primary Examiner* — Hassan Mrabi
(74) *Attorney, Agent, or Firm* — Dority & Manning, P.A.

(57) ABSTRACT

The subject matter of this specification generally relates to providing content related to text depicted in images. In one aspect, a system includes a data processing apparatus configured to extract text from an image. The extracted text is partitioned into multiple blocks. The multiple blocks are presented as respective first user-selectable targets on a user interface at a first zoom level. A user selection of a first block of the multiple blocks is detected. In response to detecting the user selection of the first block, portions of the extracted text in the first block are presented as respective second user-selectable targets on the user interface at a second zoom level greater than the first zoom level. In response to detecting a user selection of a portion of the extracted text within the first block, an action is initiated based on content of the user-selected text.

20 Claims, 6 Drawing Sheets

(51) Int. Cl.
*G06F 16/583* (2019.01)
*G06F 16/951* (2019.01)
*G06F 40/205* (2020.01)
*G06F 3/04845* (2022.01)

(52) U.S. Cl.
CPC .......... *G06F 16/951* (2019.01); *G06F 40/205* (2020.01); *G06F 2203/04803* (2013.01); *G06F 2203/04806* (2013.01)

(56) References Cited

U.S. PATENT DOCUMENTS

| | | | |
|---|---|---|---|
| 9,116,895 | B1 | 8/2015 | Eveland et al. |
| 9,342,930 | B1 | 5/2016 | Kraft et al. |
| 9,529,868 | B1 | 12/2016 | Eveland et al. |
| 9,946,715 | B1 | 4/2018 | Eveland et al. |
| 10,614,345 | B1* | 4/2020 | Tecuci ................. G06V 10/771 |
| 10,691,473 | B2 | 6/2020 | Karashchuk et al. |
| 10,725,614 | B2* | 7/2020 | Grue .................... G06F 16/5866 |
| 10,955,998 | B2* | 3/2021 | Grue ....................... G06F 16/58 |
| 11,275,493 | B1* | 3/2022 | Darmour ................. G06N 20/00 |
| 11,460,970 | B2* | 10/2022 | Agarawala ............ H04L 67/131 |
| 2003/0179932 | A1* | 9/2003 | Katsuyama ............ G06V 30/40 707/E17.02 |
| 2005/0108001 | A1 | 5/2005 | Aarskog |
| 2005/0229251 | A1 | 10/2005 | Chellapilla et al. |
| 2007/0036468 | A1* | 2/2007 | Matsushita ............. G06F 16/93 707/E17.02 |
| 2007/0067345 | A1 | 3/2007 | Li et al. |
| 2008/0010605 | A1 | 1/2008 | Frank |
| 2008/0231869 | A1* | 9/2008 | Morimoto ................ G09G 5/00 358/1.1 |
| 2011/0043869 | A1 | 2/2011 | Okajo |
| 2013/0085845 | A1 | 4/2013 | Mao |
| 2013/0085852 | A1 | 4/2013 | Mao |
| 2014/0099034 | A1 | 4/2014 | Rafati et al. |
| 2015/0026156 | A1 | 1/2015 | Meek et al. |
| 2015/0046781 | A1* | 2/2015 | Baker ................ G06F 16/24578 715/205 |
| 2015/0067484 | A1* | 3/2015 | Sumio ................... G06F 40/106 715/251 |
| 2015/0178388 | A1* | 6/2015 | Winnemoeller ........ G06Q 50/01 707/722 |
| 2015/0221077 | A1 | 8/2015 | Kawabata et al. |
| 2016/0210362 | A1 | 7/2016 | Kapadia et al. |
| 2016/0313884 | A1* | 10/2016 | Katsuyama ........... G06F 40/103 |
| 2017/0293611 | A1* | 10/2017 | Tu ........................... G06F 16/48 |
| 2018/0068433 | A1 | 3/2018 | Imakoga |
| 2018/0150557 | A1 | 5/2018 | Lev et al. |
| 2019/0138194 | A1 | 5/2019 | Ryan |
| 2020/0042865 | A1* | 2/2020 | Lee ....................... G06N 3/0454 |
| 2020/0159985 | A1* | 5/2020 | Eveland .................. G06F 16/93 |
| 2021/0208741 | A1* | 7/2021 | Yang ..................... G06F 16/951 |

FOREIGN PATENT DOCUMENTS

| | | | | |
|---|---|---|---|---|
| CN | 106415475 | | 2/2017 | |
| CN | 104982026 | B * | 6/2018 | .......... G06F 16/583 |
| CN | 104965928 | B * | 1/2019 | .......... G06F 16/583 |
| CN | 110032291 | A * | 7/2019 | ......... G06F 3/04845 |
| JP | 2010/218322 | | 9/2010 | |
| JP | 2013/501975 | | 1/2013 | |
| WO | WO 2011/017557 | | 2/2011 | |
| WO | WO 2016/192762 | | 12/2016 | |

OTHER PUBLICATIONS

International Search Report and Written Opinion for Application No. PCT/US2017/051333, dated Oct. 30, 2017, 16 pages.
Machine Translated Chinese Search Report Corresponding to Application No. 201780090761.2 dated Nov. 27, 2022.

* cited by examiner

EFFICIENTLY AUGMENTING IMAGES WITH RELATED CONTENT

CROSS-REFERENCE TO RELATED APPLICATIONS

This application is a continuation application of, and claims priority to, U.S. patent application Ser. No. 16/069,071, titled "Efficiently Augmenting Images with Related Content," filed on Jul. 20, 2018, which is a national phase application under 35 U.S.C. § 371 of PCT International Application No. PCT/US2017/051333 filed Sep. 13, 2017. The entire contents of the foregoing application are hereby incorporated by reference.

BACKGROUND

The Internet provides access to a wide variety of resources, such as image files, audio files, video files, and web pages. A search system can identify resources in response to queries. The queries can be text queries that include one or more search terms or phrases, image queries that include images, or a combination of text and image queries. The search system ranks the resources and provides search results that may link to the identified resources or provide content relevant to the queries.

Images (e.g., digital photographs) have become a popular way for users to collect and take action on information, as evidenced by the ubiquity of smartphones with cameras and camera-first applications. For example, a user that has taken a photograph on their smartphone or other device may want to obtain further information about the content of the photograph. In some cases, the user may have to open a different application to enter a query based on what the user identifies in the photograph, which is cumbersome and may result in an inaccurate or ineffective query.

SUMMARY

This specification describes systems, methods, devices, and techniques for presenting content related to text depicted in an image.

In general, one innovative aspect of the subject matter described in this specification can be implemented in a method that includes extracting, by a user device, text from a captured image. The user device can partition the extracted text into multiple blocks. The user device can present, at a first zoom level, the blocks as respective user-selectable targets on a user interface of the user device. A user selection of a first block of the multiple blocks can be detected. In response to detecting the user selection of the first block, the user device can present, at a second zoom level greater than the first zoom level, portions of the extracted text in the first block as respective second user-selectable targets on the user interface of the user device. In response to detecting a user selection of a portion of the extracted text within the first block, the user device can initiate an action based on the content of the user-selected text. Other implementations of this aspect include corresponding apparatus, methods, and computer programs, configured to perform the actions of the methods, encoded on computer storage devices.

These and other implementations can optionally include one or more of the following features. In some aspects, initiating the action can include initiating communication to a destination address identified by the user-selected text.

Initiating the action can include generating, based on the content of the user-selected text, a search query and sending, by the user device, the search query to a search engine. Initiating the action can include generating, based on the content of the user-selected text, two or more candidate search queries, displaying the candidate search queries on the user interface, and responsive to user selection of one of the candidate queries, sending, by the user device, the selected candidate query to the search engine.

Some aspects can include extracting, by the user device, context from the image. Generating the search query or the candidate search queries can include generating the search query or the candidate search queries further based on the extracted context of the image.

Some aspects can include extracting, by the user device, context from the image and determining, by the user device and using the extracted context of the image, whether the image falls into one of a multitude of predefined categories. Generating the search query or the candidate search queries can include generating the search query or the candidate search queries based on the extracted context if the image falls into one of the predefined categories, otherwise generating the search query or the candidate search queries based only on the content of the user-selected text.

In some aspects, the user device can generate, for at least one block and before user selection of any of the blocks, one or more search queries based on the extracted text of the block. The user device can send the one or more search queries from the user device to a search engine. The user device can generate and send the one or more search queries before presenting the blocks as respective user-selectable targets on the user interface.

In some aspects, the user device can receive search result content from the search engine based on the one or more search queries and store the received search result content in a local memory of the user device. Generating the one or more search queries based on the extracted text of the block can include parsing the extracted text of the block into multiple first sets of text at a first level of text-based granularity and generating a search query for each first set of text.

Some aspects can include, in response to detecting the user selection of the block, parsing the extracted text of the block into multiple second sets of text at a second level of text-based granularity greater than the first level of text-based granularity and, prior to receiving the user selection of a portion of the extracted text within the first block, generating an additional search query for each second set of text, sending each additional search query from the user device to the search engine, receiving, by the user device and from the search engine, additional search result content based on the additional search queries, and storing the additional search result content in local memory of the user device.

In some aspects, partitioning the extracted text into the blocks is based at least partially on semantic analysis of the extracted text. Some aspects can include displaying, on the user interface, content received at the user device from the search engine.

In general, another innovative aspect of the subject matter described in this specification can be implemented in a method that includes extracting, by a user device, text from an image. The user device can partition the extracted text into multiple blocks. The user device can present, at a first zoom level, the multiple blocks as respective first user-selectable targets on a user interface of the user device. A user selection of a first block of the multiple blocks can be detected. In response to detecting the user selection of the first block, the user device can present, at a second zoom level greater than the first zoom level, portions of the extracted text in the first block as respective second user-selectable targets on the user interface of the user device. In response to detecting a user selection of a portion of the extracted text within the first block, the user device can initiate an action based on content of the user-selected text.

In some aspects, initiating the action can include initiating communication to a destination address identified by the user-selected text. Initiating the action can include generating, based on the content of the user-selected text, a search query and sending the search query to a search engine.

Some aspects can include extracting, by the user device, context from the image, determining, using the extracted context of the image, that the image belongs to one of a multitude of predefined categories, and adjusting the search query based on the extracted context in response to determining that the image belongs to one of the predefined categories.

Some aspects can include receiving, by the user device and from the search engine, search result content selected based on the search query. The search engine can rank the search results based on the one predefined category to which the image belongs. Some aspects can include extracting, by the user device, context from the image and determining, using the extracted context of the image, that the image does not belong to one of a multitude of predefined categories. Generating the search query can include generating a general search query based only on the user-selected text.

In some aspects, initiating the action can include generating, based on the content of the user-selected text, two or more candidate search queries, displaying the candidate search queries on the user interface, and responsive to user selection of one of the candidate queries, sending, by the user device, the user-selected candidate query to a search engine.

Some aspects can include, before user selection of any of the blocks and for the first block, generating, by the user device, one or more search queries based on the extracted text of the first block and sending the one or more search queries from the user device to a search engine.

In some aspects, the user device generates and sends the one or more search queries before presenting the multiple blocks as respective first user-selectable targets on the user interface. Some aspects can include receiving search result content from the search engine based on the one or more search queries and storing the received search result content in local memory of the user device.

In some aspects, generating the one or more search queries based on the extracted text of the first block can include parsing the extracted text of the first block into multiple first sets of text at a first level of text-based granularity and generating a search query for each first set of text.

Some aspects can include, in response to detecting the user selection of the first block, parsing the extracted text of the first block into multiple second sets of text at a second level of text-based granularity greater than the first level of text-based granularity and prior to receiving the user selection of a portion of the extracted text within the first block, generating an additional search query for each second set of text, sending each additional search query from the user device to the search engine, receiving, by the user device and from the search engine, additional search result content based on the additional search queries, and storing the additional search result content in local memory of the user device.

In some aspects, partitioning the extracted text into the blocks is based at least partially on semantic analysis of the extracted text. Some aspects can include displaying, on the user interface, content received at the user device from the search engine. Displaying, on the user interface, content received at the user device from the search engine can include displaying the content in a viewport of the user device along with at least a portion of the image.

It has been proposed to use OCR (optical character recognition) to extract text from physical documents (particularly via scanned documents). However, the extracted text is generally treated as a block of text. In contrast aspects of the present disclosure may make all (or some) words, phrases, and/or blocks of text (including numbers, such as for example telephone numbers) in an image into respective user-selectable targets. A user can obtain more information about the content of an image by launching a query based on a text item in the image by selecting the block containing/comprising the text item. Content returned by the query is displayed on the user interface of the user device. Compared to a prior process in which a user is required to manually enter text from an image into a search engine in order to initiate a query, aspects of the invention eliminate the possibility of a user making an error when manually entering a search term and having to re-enter the search term. This makes more efficient use of network and search engine resources, as it avoids the possibility of a search engine responding to a query that had been entered incorrectly and having to repeat the query and retrieval process when the user realizes their error and re-sends the corrected query.

Particular embodiments of the subject matter described in this specification can be implemented so as to realize one or more of the following advantages. Identifying content (e.g., via a query) based on text that is depicted within an image and that is selected by a user rather than requiring the user to manually enter a text query results in more efficient use of network and search engine resources by reducing the number of submitted queries that traverse the network, by reducing the number of search queries that are processed by the search engine, and by reducing the number of search results provided over the network in response to the search queries. For example, a user may incorrectly enter, as a query, the text that the user sees in the image or may submit a query that does not accurately reflect the content of the image requiring one or more query revisions and subsequent network communications and search engine processing until the correct query results in search results that satisfy the user's informational needs. These extra queries consume network and search engine resources, resulting in less network and search engine bandwidth that could be used to process other network traffic and other queries and/or longer search engine response time especially when scaled up across many users of a search engine. Thus, identifying content in response to user selection of text that accurately reflects the user's informational needs can result in more network bandwidth, faster network and search engine response times, and/or more queries processed by the search engine.

Allowing the user to select text rather than retype the text is also more efficient for the user and allows the user to more quickly request content related to the text. This also makes it easier for a user to submit multiple queries by simply selecting different targets for different portions of text.

Zooming techniques described herein enable users to quickly and efficiently select text for which the user would like to receive additional content. For example, creating user-selectable targets for each portion of text when the user device is at a low zoom level (e.g., a lowest zoom level in which text is smallest) can result in a user selecting the wrong text such as text neighboring the text the user intended to select. This can result in unintentional queries being transmitted over the network to the search engine with the disadvantages described above, any may also cause user frustration. By creating user-selectable targets for blocks of text at appropriate zoom levels and then creating user-selectable targets for smaller portions of text at higher zoom levels, users can more easily select the correct text. The zooming techniques can result in more network bandwidth, faster network response times, more queries processed by the search engine, and faster search engine response times due to the reduction in the number of unintentional queries transmitted over the network to the search engine.

Content for an image can be pre-cached at the user device based on the zoom level and/or the text within the image that is presented in a viewport of a user device at that zoom level. When the zoom level changes, additional (and/or alternative) content can be pre-cached based on the updated zoom level and/or the text presented in the viewport at the updated zoom level. In this way, content related to text within the image can be presented more quickly in response to a user selection of the text.

Various features and advantages of the foregoing subject matter is described below with respect to the figures. Additional features and advantages are apparent from the subject matter described herein and the claims.

For the avoidance of doubt, as used herein "text" is intended to encompass letters, numerals and/or symbols so that a telephone number or an e-mail address, for example, may constitute a block of text.

DETAILED DESCRIPTION

In general, systems and techniques described herein identify and provide additional content related to text and/or other content depicted in an image. A user can use the camera of a smartphone or other user device to capture an image. The text within the image can then be used to identify additional content. For example, the image may depict a restaurant menu. The user device can present user-selectable targets at or around the text that allows the user to select text and view additional content related to the selected text. For example, the user may select a menu item and view content related to the menu item (e.g., nutritional information), images of the menu item, or other types of content related to the menu item. The additional content can be presented instantaneously (or almost instantaneously) in response to the selection using pre-caching techniques described below.

The user device can partition text depicted in an image into blocks, e.g., using semantic analysis of the text and/or the arrangement of the text in the image, and present each block as a user-selectable target. For example, the user device can partition text in an image of a menu into multiple blocks that include a block for each section of the menu (e.g., a block for appetizers, a block for entrees, etc.) based on the layout and semantic analysis of the text in the image. When a user selects one of the blocks, the user device can present the selected block at a higher zoom level and present portions of text within the block as user-selectable targets. For example, the user device can identify phrases, menu items, or other related portions of text and present at least some of the related portions of text as a user-selectable target at the higher zoom level. By varying the zoom level and the user-selectable targets based on the varied zoom level, users can more easily select the text for which the user would like to view additional content.

At each zoom level, content can be pre-cached at the user device based on the text presented by the user device at the zoom level. As the user adjusts the zoom level, additional and/or different (alternative) content can be pre-cached at the user device (e.g., before the user selects text) based on the text that is presented by the user device at the updated zoom level. In this way, content related to text that the user selects can be provided instantaneously or at least quicker than transmitting a request over a network after the user makes the selection.

Figure 1:
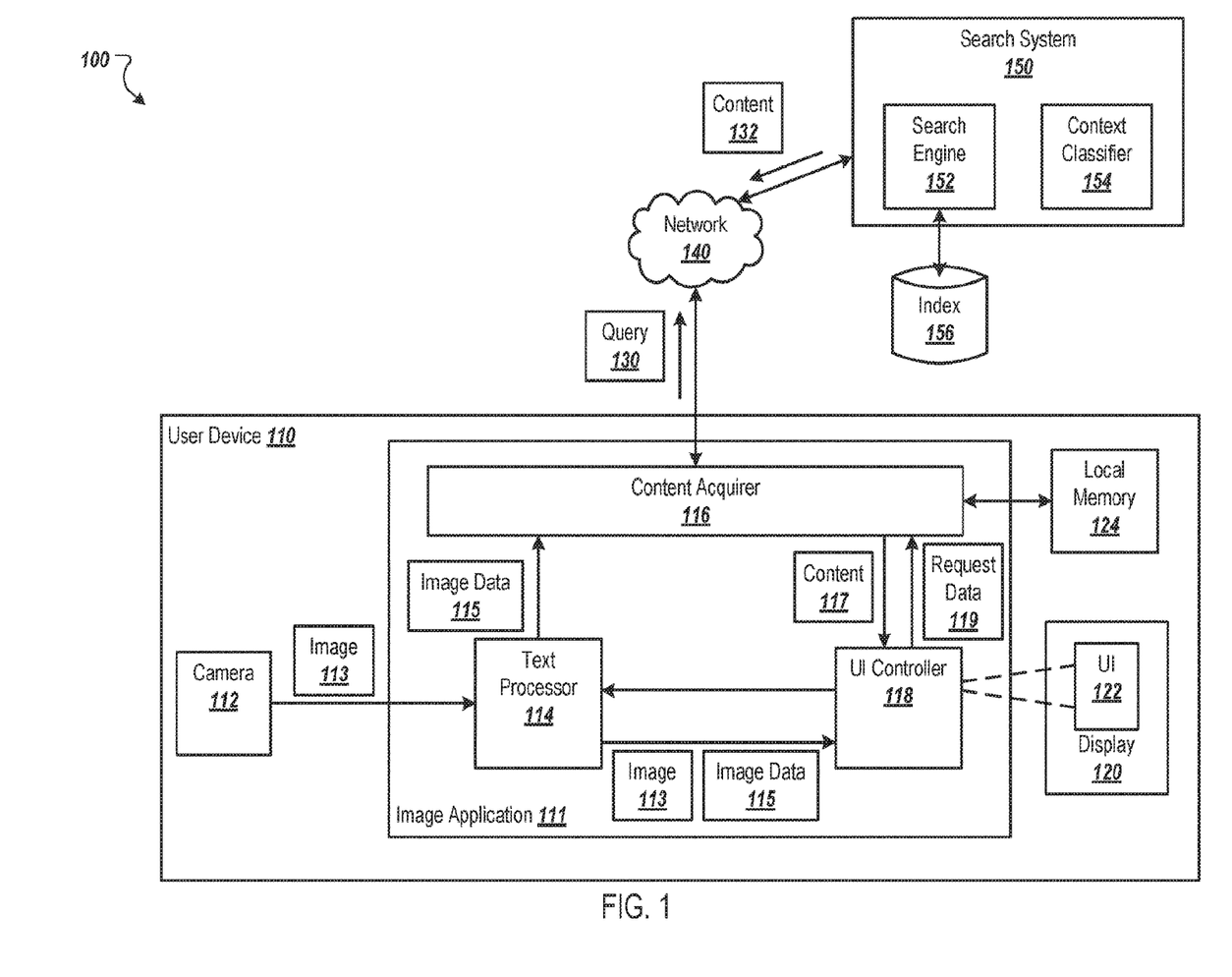
FIG. 1 is an example environment in which a user device presents content related to text depicted in images.

FIG. 1 is an example environment 100 in which a user device 110 presents content related to text depicted in images. The user device 110 can be a smartphone, tablet computer, wearable device, or other type of mobile or non-mobile electronic device. The user device 110 includes a camera 112 that captures images 113 and/or video. The user device 110 also includes a display 120 that presents the images 113 and/or video, and content related to the images 113. The display 120 can include an input device, such as a touchscreen, that allows users to interact with text depicted in the images 113 presented at the display 120, as described in more detail below.

The user device 110 includes an image application 111 that allows a user to capture images using the camera 112 or view objects in the field of view of the camera's lens using a viewfinder. The image application 111 also allows users to view and/or listen to content related to text depicted in the images. For the purpose of this document, an image refers to an image captured by the camera 112 and to the visible content in a viewfinder that shows the field of view of the camera's lens. The image application 111 can also allow a user to view additional content related to text depicted in images that are stored at the user device, e.g., in local memory 124 of the user device 110, or stored at a different location. For example, the user can use the image application 111 to select an image stored at the user device 110 (or at a networked location) and view the image and/or content related to text depicted in the image. The local memory 124 can include internal memory of the user device 110 (e.g., flash memory of the user device 110) or external memory connected to the user device 110 (e.g., memory connected to a universal serial bus (USB) port of the user device 110).

The image application 111 includes a text processor 114 that processes text depicted in images. The text processor 114 can recognize text depicted in images, e.g., using optical character recognition (OCR). In some implementations, the text processor 114 includes a lightweight OCR engine that is executed on the user device 110 to increase the speed at which text is identified in images, e.g., relative to full service OCR applications located at a networked location. A lightweight OCR engine is an OCR engine that uses a small amount of memory (e.g., less than a threshold amount of memory) and/or that identifies text in images using minimal processing power of the user device 110. Although the lightweight OCR engine may use additional processing power of the user device 110 relative to transmitting the image to an OCR engine at a networked location, the lightweight OCR engine allows for the text recognition to be performed faster than it would if the image was transmitted over a network, processed by an OCR engine, and the text transmitted back to the user device 110. This reduces the latency in recognizing text and presenting content related to the text. The lightweight OCR engine can be implemented as a software development kit (SDK) that includes functions for identifying text in images.

The text processor 114 can also process text depicted in images to identify blocks, phrases, or other portions of related text. In some implementations, the text processor 114 can identify related text based on the arrangement of the text within in the image. For example, the text processor 114 can identify, as related text, text that is grouped together and/or that has the same (or similar) visual characteristics, such as the same font type, size, and/or color. A group of text can include text that is within a threshold distance of other text within the group and/or text that is located within visible edges or borders within the image. For example, a group of text may include text that is within a visible block (e.g., a square, rectangle, or other appropriate shape with visible borders) depicted in the image or that is to one side of a dividing line depicted in the image.

In some implementations, the text processor 114 performs semantic analysis on the text depicted in images to identify related text. For example, the text processor 114 can use semantic analysis to identify, as related text, phrases, clauses, sentences, or paragraphs within the text depicted in the images. The text processor 114 can also use semantic analysis and/or the arrangement of the text within the image to identify blocks of related phrases, clauses, sentences, paragraphs, or individual words. For example, by analyzing all (or a large portion of) the recognized words in the image, the text processor 114 can determine the category for the image, as described below, and use the category for the image to disambiguate the meaning of words that may have multiple meanings. In another example, the text processor 114 can use the arrangement of text to determine that a word is included in a particular part of the image that includes a particular heading and use the heading to determine the meaning of a word. For example, if the word "cheek" is in an image of a menu and under a heading "BBQ Entrees," the text processor 114 can determine that the word "cheek" refers to a food item rather than a body part.

In some cases, a block of text includes multiple lines of text. For example, a block of text for appetizers on a menu can include one or more lines of text for each appetizer. In other cases, a block of text may include a single phrase or a single word. For example, a block of text may include text painted on the side of a boat or carved into a sign at a park.

The text processor 114 can output image data 115 that specifies the text identified in a processed image and each block (or other portion) of text identified in the image. For each block of text, the image data 115 can specify the actual text (e.g., actual words and phrases) included in the block. The image data 115 can also specify the location of each portion of text within the image. For example, the image data 115 can include, for a block of text, coordinates within the image that enclose the block of text or coordinates of each corner of a rectangular block of text. As described below, a content acquirer 116 of the image application 111 can use the image data 115 to acquire content related to the text identified in the image, e.g., to pre-cache the content in the local memory 124.

A user interface controller 118 of the image application 111 can receive images 113 and generate user interfaces 122 that present the images 113 on the display 120. In some implementations, the image application 111 provides images 113 captured by the camera 112 directly to the user interface controller 118 for display by a display 120 of the user device 110, e.g., before the images are processed by the text processor 114. In this way, the images 113 are displayed immediately after the images are captured.

The user interface controller 118 can also receive the image data 115 for an image 113 output by the text processor 114. The user interface controller 118 can use the image data 115 (e.g., the data indicating the blocks of text and their locations within the image 113) to generate user-selectable targets for blocks of text identified by the text processor 118. The user-selectable targets allow a user to select a block of text to obtain content related to the text in the block, to zoom into the block to select text within the block, and/or to initiate another action. Each user-selectable target can include a selectable portion of the display (e.g., a selectable touchscreen area) and a visual indicator that indicates that the block is selectable. For example, a user-selectable target for a block of text can include, as the visual indicator, a selectable icon, a highlighted box (or other shape) around the block, a different background color for text in the block, a different font color for text in the block, highlighted or bolder text, or some other appropriate visual indicator that indicates to a user that the block is selectable. A user can select a user-selectable target by interacting with the target, e.g., by clicking on the target, hovering a pointer over the target, touching a touchscreen at the location of the target, or using other appropriate user interactions.

The user interface controller 118 can present the image 113 with the user-selectable targets in the user interface 122. The user interface controller 118 can also generate user-selectable targets for portions of text included in the blocks. For example, the user interface 122 can include, for a block of text, a user-selectable target that enables a user to zoom into the block to make the text in the block larger. The user interface 122 can also include, for each of one or more portions of text in the block, a user-selectable target that allows the user to select the portion of text to request content related to the portion of text. In some implementations where images 113 are displayed immediately after the images are captured as described above, once the image has been processed by the text processor, the user interface controller 118 may supplement the initially-displayed image with the user-selectable targets.

In some implementations, the user interface controller 118 can include two user-selectable targets for a block of text. For example, a first user-selectable target can allow a user to zoom into the block of text and a second user-selectable target can allow a user to request content related to the text within the block. In another example, the user interface controller 118 can zoom into the block of text in response to a user selecting a location within the block that does not include text, e.g., a space between text. If the user selects text within the block, the user interface controller 118 can initiate a request for content related to the user-selected text or the text within the block.

The user interface controller 118 can determine whether to zoom into a block of text or to present content in response to a user selection of the text block. In some implementations, the user interface controller 118 can determine whether to zoom in or present content based on the text within the selected text block, e.g., based on the semantic content of the text within the selected text block. For example, if a text block include text that is related to one particular entity or a specific type of content, the user interface controller 118 can determine to present content related to the entity rather than zoom into the text block. In another example, if a text block includes text related to a particular cuisine, the user interface controller 118 can determine to present content related to the particular cuisine in response to a user selection of the text block. The content can be, for example, a character avatar next to the text block with dish reviews in an animated speech bubble. If the text block includes text related to multiple entities or multiple types of content, the user interface controller 118 can determine to zoom into the text block in response to a user selection of the text block.

The user interface controller 118 can adjust the zoom level each time the user selects a user-selectable target for a portion of text, e.g., until a particular zoom level is reached. If a user selects a block of text, the user interface controller 118 can zoom into the block of text to so that the text in the block is larger on the display 120. For example, the user interface controller 118 can zoom into the image on the display 120 such that the user-selected block fills the viewport of the display 120 in at least one dimension (e.g., horizontal and/or vertically).

The user-interface controller 118 can also present at least a portion of the text in the user-selected block as user-selectable targets. In this way, the user can select a portion of the text, e.g., a word or phrase, to request content related to the word or phrase. In some implementations, if the user selects a phrase or other portion of text that includes more than one word, the user interface controller 118 may further zoom into the portion of text and present user-selectable targets for sub-portions of the selected portion. For example, if the user selects a phrase, the user interface controller 118 can zoom in such that the phrase fills the viewport of the display in at least one dimension (e.g., horizontal and/or vertical). The user interface controller 118 can also present sub-portions of text as user-selectable targets. For example, if the user selects the phrase "red wine" in an image of a menu, the user interface controller 118 can zoom into the phrase and presents the word "red" as one user-selectable target and the word "wine" as a second user-selectable target.

The user interface controller 118 can select portions of the text in the user-selected block to present as user-selectable targets based on the content of the portions of text. In some implementations, the user interface controller 118 can select the of text based on content available for the text portions. For example, the user interface controller 118 can access a list of known entities for which a particular type of content is available (e.g., entities for which a knowledge panel that includes a summary of information for the entity is available). If a portion of text includes a name or other reference to an entity in the list of known entities, the user interface controller 118 can present the portion of text as a user-selectable target so that a user can select the portion of text to request additional content related to the entity.

In some implementations, the user interface controller 118 ranks the portions of text in the user-selected block and presents higher ranked portions of text as user-selectable targets while not presenting lower ranked portions of text as user-selectable targets. For example, the user interface controller 118 can select a specified number or percentage of the portions of text having the highest rank or those having a rank score that satisfied (e.g., exceeds) a threshold score. The user interface controller 118 can rank (and/or determine rank scores for) the portions of text based on the amount of content available for each portion of text, a relatedness between each portion of text and a category for the image, a popularity of entities referenced by the portions of text (e.g., based on a number of queries received for each entity), and/or other appropriate criteria.

The user interface controller 118 can also zoom out from text in response to user interactions. For example, the user interface controller 118 can zoom out to present more of the image in response to a user pinch at a touchscreen or selection of an icon for zooming out.

When the user initiates a request for content, e.g., by selecting a user-selectable target for a portion of text, the UI controller 118 can send request data 123 to the content acquirer 116. The request data 119 can specify the text that has been selected. For example, if the user selects a user-selectable phrase depicted in the image that is presented in the user interface 122, the user interface controller 118 can generate request data 119 that specifies each word in the phrase. In another example, if the user selects a block of text, the user interface controller 118 can generate request data 119 that specifies each word in the block of text.

In some implementations, the request data 119 includes contextual data. For example, the request data 119 can include other text that has not been selected. In a particular example, the request data 119 can include each word (or some of the words) identified in the image or each word (or some of the words) that is visible in the user interface 122 based on a current zoom level. As described below, the contextual data can be used to identify a category for the image, which can then be used to disambiguate selected words and to select content for presentation in response to the user selection. For example, additional words in an image of a menu can be used to determine that a selected word, such as "shoulder," corresponds to a food item and select appropriate content.

The content acquirer 116 can receive the request data 119 from the user interface controller 118 and obtain content from a search system 150 (or local memory 124) based on the request data 119. In some implementations, the content acquirer 118 generates query data that specifies one or more search queries based on the request data 119 and sends the query data 130 to the search system 150 over a data communication network 140, e.g., a local area network (LAN), a wide area network (WAN), a mobile network, the Internet, or a combination thereof. The one or more queries can include the text selected by the user. The query data 130 can also include the contextual data.

The search system 150 includes a search engine 152 and a context classifier 154. The search engine 150 can use an index 156 to identify content based on the word(s) included in the one or more search queries included in the query data 130. The index 156 can include data specifying electronic resources (e.g., web pages, images, videos, and/or other content) that can be provided in response to a query or that can be referenced in a search result provided in response to a query.

The context classifier 154 can use one or more machine learning models to classify an image (or a portion of an image that is visible in the user interface 122) based on text depicted in the image or the portion of the image. The machine learning model can be trained using labeled training data. The labeled training data can include a set of training images and, for each image, data specifying words depicted in the image and a label that specifies a category for the image. Example categories can include restaurant menu, sign (e.g., street sign or store sign), magazine, movie poster, music poster, etc. Although FIG. 1 illustrates the context classifier 154 as being part of the search system 150, the context classifier 154 can be implemented on the user device 110 in some implementations.

When query data is received, the context classifier 154 can use the contextual data of the query data 130 and the machine learning model(s) to attempt to classify the image into one of a set of predefined categories for which the machine learning model has been trained to classify images. In some implementations, the search engine 152 adjusts the search queries and/or adjusts the ranking of resources based on the classification and/or whether the image has been successfully classified.

If the context classifier 154 classifies the image into one of the categories, the search engine 152 (or the content acquirer 116 if the context classifier 154 is implemented on the user device 110) can adjust the search query to include one or more terms based on the category to which the image was classified. For example, if the image is classified as being a movie poster, the search engine 152 can add the word "movie" to the search query. In a particular example, the user-selected text may be the movie title "Alien." The context classifier 154 can use additional words depicted in the movie poster, e.g., actor names or a description of the movie, to classify the image as a movie poster. The search engine 152 can then add the word "movie" to the query "Alien" to form the query "Alien movie." In this way, the search results would be more likely to be related to the movie "Alien" rather than other content related to aliens in general.

In some implementations, the search engine 152 adjusts the ranking of search results based on the classification of the image. For example, rather than modify the search query, the search engine 152 can boost search results (e.g., increase the rank of the search results) for resources related to the category for the image and/or decrease the ranking of search results that are not related to the category for the image. In some implementations, the search engine 152 can adjust the ranking of types of resources based on the category for the image. For example, if the category for the image is music poster, the search engine 152 can boost audio and video resources and decrease the ranking of web page resources.

If the context classifier 154 does not classify the image into one or the categories, e.g., because the contextual data is not related to one of the categories, the search engine 152 can perform a general search using the user-selected text. This may be a fallback option for images for which a category cannot be determined based on the contextual data received by the context classifier 154. For example, an image of a store sign may include only a single word with no additional contextual text that can be used to classify the image.

The search engine 152 can provide content 132 to the context acquirer 116 based on the search query and the ranking of resources identified in response to the search query. For example, the search engine 152 can provide, with the content 132, a specified number of the highest ranked resources. In another example, the search engine 152 can provide, with the content 132, search results that reference, e.g., link to, the highest ranked resources. For example, as described below, content can be presented with the image or a search results page may be presented that includes search results selected based on the user-selected text. The content acquirer 116 can receive the content 132 and provide the content 132 to the user interface controller 118. In turn, the user interface controller 118 can present at least a portion of the resources included in the content 132 in the user interface 122 with the image or the search results on a search results page. For example, the user interface controller 118 can present, as the content, text and/or images extracted from web page resources, links to videos hosted by a web site, and/or thumbnail images for videos that, if selected by the user, initiates playback of the video in the user interface.

The content acquirer 116 can also pre-cache content in the local memory, e.g., prior to receiving a selection of text depicted in an image. In some implementations, the content acquirer 116 sends query data 130 to the search system 150 based on the image data 115 output by the text processor 114. The query data 130 can include all of the text identified in the image by the text processor 114. The search engine 152 can identify content based on the text and/or a category of the image determined by the context classifier 154. The content acquirer 116 can receive the identified content from the search engine 152 and store the content in the local memory 124. In this way, if the user requests content related to the image as a whole, the content acquirer 116 can obtain content from the local memory rather than transmitting additional query data over the network 140 to the search system 150 after the user request. This can reduce latency in presenting the content to the user and allow the user to view additional content related to selected text instantaneously or almost instantaneously (e.g., in less than a threshold amount of time such as a second).

In some implementations, the content acquirer 116 generates, for pre-caching, queries for different text-based granularities based on the zoom level of the user interface 122. A text-based granularity defines how much text is used to generate each query. For example, at one text-based granularity, individual words may be used to generate the queries. At a higher text-based granularity, individual phrases or other sets of multiple words up to a threshold number of words can be used to generate the queries.

When the zoom level allows for the entire image to be viewable in the user interface, the content acquirer can generate one or more queries for each block of text for which a user-selectable target is presented. For example, the text processor 114 can identify a number distinct blocks of text in an image and request separate content for each block, e.g., prior to receiving a user selection of one of the blocks. In a particular example, an image of a menu may include a first block of text for appetizers, a second block of text for entrees, and a third block of text for drinks. In this example, the query data 130 can include a list of the appetizers in the first block, a list of the entrees in the second block, and a list of the drinks in the third block. The search engine 152 can identify content (e.g., electronic resources) for each block separately and provide the content to the content acquirer 116. The content acquirer 116 can store the content in the local memory 124. In this way, if the user selects one of the blocks, the content acquirer 116 can obtain the content for the user-selected block from the local memory 124 without transmitting additional query data over the network 140 to the search system 150 after the user selection.

The content acquirer 116 can update the content stored in the local memory 124 in response to user interactions with the user interface 122 that change the zoom level of the user interface 122. For example, if the user selects one of the blocks, the user interface controller 118 can zoom in to the selected block and present at least some portions of the text in the user-selected block as user-selectable targets. The content acquirer 116 can also generate queries at a different text-based granularity based on the updated zoom level. For example, the content acquirer can generate queries for each phrase identified in the selected block or each phrase in the selected block that the user interface controller 118 will present as a user-selectable target.

Continuing the previous menu example, if the user selects the block for appetizers, the content acquirer 116 can generate one or more queries for each phrase that represents an appetizer. The content acquirer 116 can send query data 130 that specifies the queries to the search engine 152, e.g., before the user selects one of the appetizers or before the appetizers are presented as user-selectable targets in the user interface 122. The search engine 152 can identify content for each appetizer and provide the identified content to the content acquirer 116. The content acquirer 116 can store the content in the local memory 124. In this way, if the user selects one of the appetizers, the content acquirer 116 can obtain the content for the user-selected appetizer from the local memory 124 without transmitting additional query data over the network 140 to the search system 150 after the user selection.

In some implementations, the user interface controller 118 can perform actions other than requesting content related to user-selected text based on content of the text. For example, if the image depicts a phone number, the user interface controller 118 can initiate a phone call on a smartphone in response to a user selection of the phone number display by the smartphone. In another example, if the image depicts an address, the user interface controller 118 can open a map application and request that the map application display a map of the location referenced by the address in response to a user selection of the address. In yet another example, if the image depicts a destination address for a web resource, e.g., a universal resource locator (URL), the user interface controller 118 can open an application (e.g., a web browser) and request that the application navigate to the electronic resource referenced by the network address. In yet another example, if the image depicts an e-mail address for a web resource, the user interface controller 118 can, in response to a user selection of the e-mail address, initiate an e-mail to that e-mail address, for example by opening an e-mail application and displaying a blank e-mail addressed to the e-mail address.

In some implementations, the user interface controller 118 generates a user interface that augments content shown in a viewfinder. For example, a user may point the camera 112 at a menu or other object. The user interface controller 118 can generate user-selectable targets for text blocks and/or other portions of text currently shown in the viewfinder and present the user-selectable targets with the text in the viewfinder. If the user moves the camera 112, the user interface controller 118 can move the user-selectable targets to their appropriate locations with the text for which the user-selectable targets were generated. If new text becomes visible in the viewfinder, the user interface controller 118 can process the text as described above to generate user-selectable targets and present content in response to user selections of the user-selectable targets.

Figure 2:
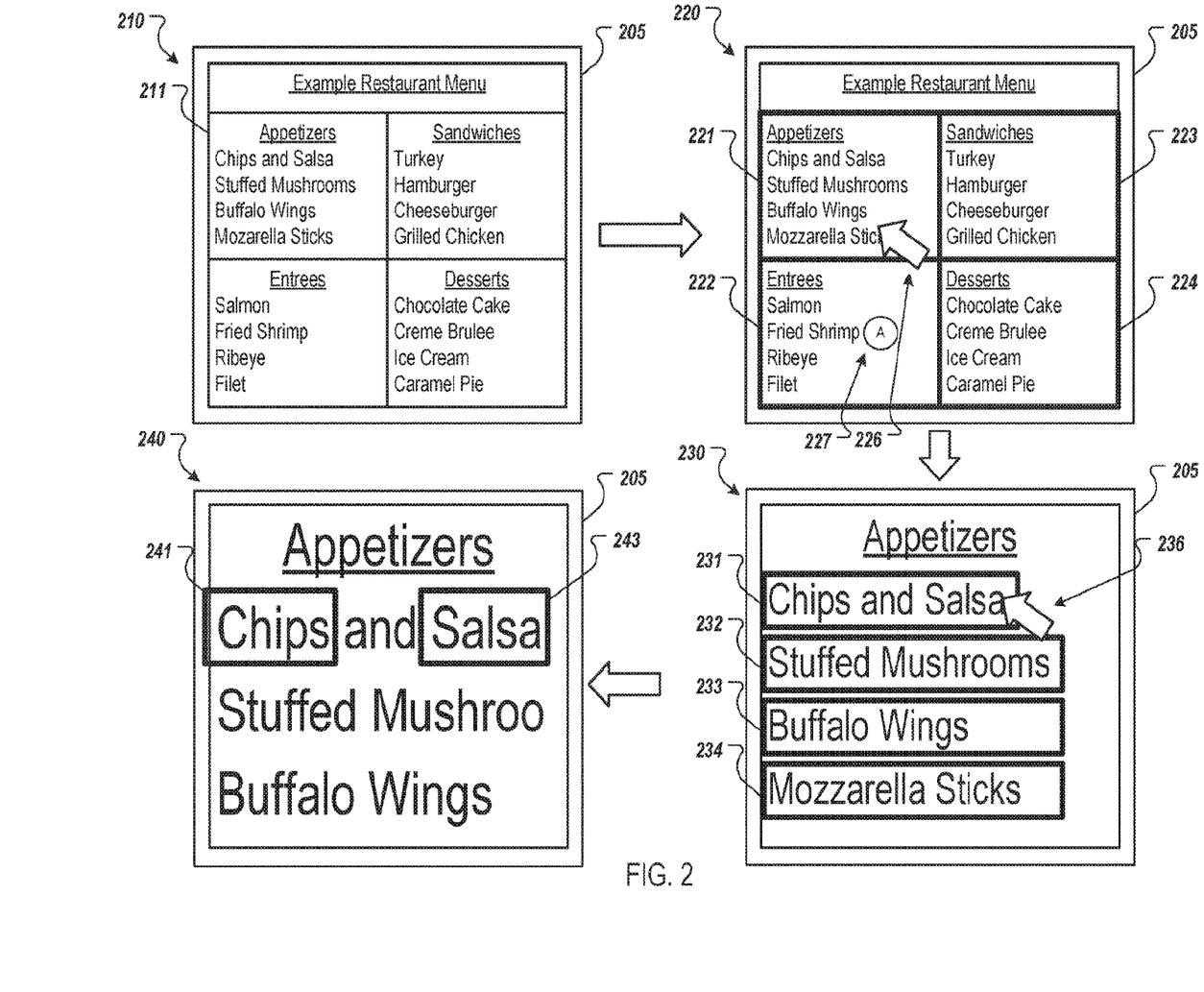
FIG. 2 depicts example screen shots of an example user interface that enables a user to select text to request additional content related to the user-selected text.

FIG. 2 depicts example screen shots of an example user interface 205 that enables a user to select text to request additional content related to the user-selected text. A first screen shot 210 of the user interface 205 shows the user interface 205 presenting an image 211 of a menu from an example restaurant. For example, a user may have used a camera of a smartphone to capture the image 211 of the menu. The example menu includes a section for appetizers, a section for sandwiches, a section for entrees, and a section for desserts.

A second screen shot 220 of the user interface 205 illustrates user-selectable targets 221-224 that have been created for the different sections of the menu. For example, a user interface controller, e.g., the user interface controller 118 of FIG. 1, can identify that each section of the menu is a block of related text and present each section as a user-selectable target. In particular, the user-selectable target 221 allows a user to select the appetizers section of the menu; the user-selectable target 222 allows a user to select the entrees section of the menu; the user-selectable target 223 allows a user to select the sandwiches section of the menu; and the user-selectable target 224 allows a user to select the desserts section of the menu.

In this example, each user-selectable target 221-224 includes a thick line around its section that indicates to a user that the section of the menu is selectable. In some implementations, the line around each section can be a particular color or have a particular brightness to draw the user's attention to the fact that the section can be selected. In other examples, the background color behind the text of each section may be highlighted or changed to indicate that the section is selectable or the text color may be changed to indicate that the section is selectable.

The example user interface 205 has also been updated to include an allergy indicator 227 in the screen shot 220. In some implementations, an image application, e.g., the image application 111 can access user data provided by the user to present additional content related to the user and related to text depicted in an image. An example of the user data is a list of food items to which a user is allergic. The image application can compare food items of a menu to the list of allergies and, if there is a match, present an allergy indicator next to the item in the menu. In this example, the user is allergic to shrimp and the allergy indicator 227 indicates the menu item to the user.

A user can select a user-selectable target by touching within the user-selectable target (if the user device has a touchscreen), by clicking on the user-selectable target using a pointer and a mouse, or another appropriate way. In this example, the user used a pointer 226 to select the user-selectable target 221 to zoom into the appetizers section of the menu.

In response the selection of the user-selectable target 221, the user interface 205 is updated to present a zoomed in view of the appetizers section as shown in the example screen shot 230. For example, the image 211 of the menu can be displayed at a first zoom level, e.g., a default zoom level. When the user-selectable target is selected, the zoom level of the user interface can be update to a second zoom level that is greater than the first zoom level to present the text in the selected section at a higher zoom level. This enables a user to better view the text in the selected section and to better select text for which the user would like to further zoom into or request content.

In the example screen shot 230, the user interface 205 also depicts each appetizer as a user-selectable target. For example, the appetizer chips and salsa is presented as user-selectable target 231; the appetizer stuffed mushrooms is presented as user-selectable target 232; the appetizer buffalo wings is presented as user-selectable target 233; and the appetizer mozzarella sticks is presented as user-selectable target 234. As described above, when a user selects a block of text, at least a portion of the text in the selected block can be presented as user-selectable targets.

When the user selects a user-selectable target, the user interface 205 can be updated to zoom further in or to present content related to the content of the user-selected target. In this example, the user selected the user-selectable target 231 for chips and salsa using pointer 236 and, in response, the user interface 205 is updated to zoom further in to the phrase chips and salsa as shown in the example screen shot 240.

The user interface 205 has also been updated to present user-selectable targets for words of the phrase "chips and salsa." In particular, the user interface 205 includes a user-selectable target 241 for the word "chips" and a user-selectable target 243 for the word "salsa." The user interface 205 may not include a user-selectable target for the word "and" or other words that are unlikely to be selected by a user. For example, as described above, a user interface controller can select which words or phrases of a selected block or other portion of text are to be presented as user-selectable targets based on content available for the content of the text (e.g., for an entity referenced by the text) or other criteria.

If the user selects the user-selectable target 241, the user interface 205 can be updated to present content related to chips, such as nutritional information for chips, images of chips, recipes of chips, etc. Similarly, if the user selects the user-selectable target 243, the user interface 205 can be updated to present content related to salsa, such as nutritional information for salsa, images of salsa, recipes of salsa, etc.

Figure 3:
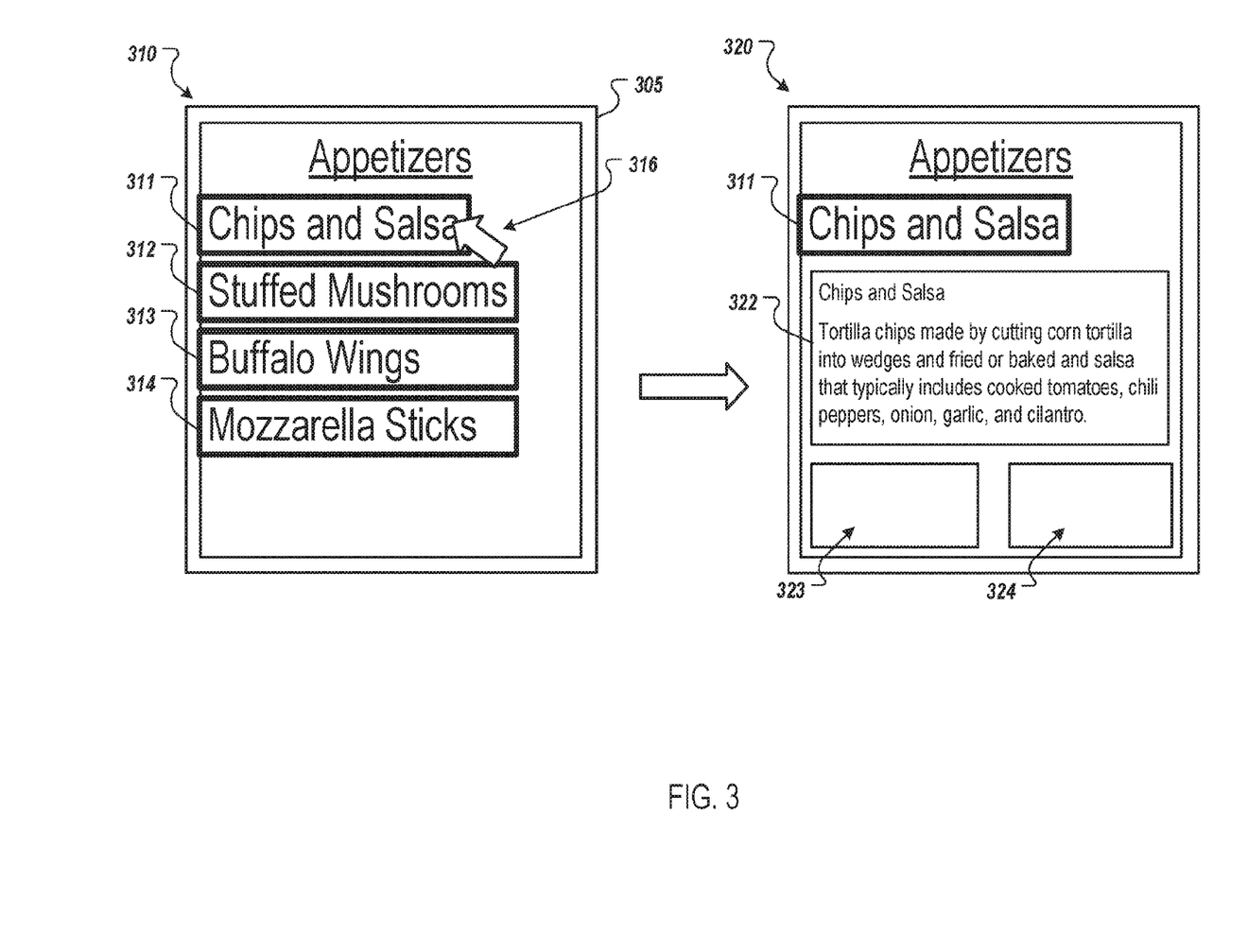
FIG. 3 depicts example screen shots of an example user interface that enables a user to select text and view content related to the selected text.

FIG. 3 depicts example screen shots 310 and 320 of an example user interface 305 that enables a user to select text and view content related to the selected text. The screen shot 310 is similar to the screen shot 230 of FIG. 2. In the screen shot 310, the user interface 305 presents a partial view (e.g., a zoomed in view) of an image of a menu. In particular, the user interface 305 presents the portion of the image that includes the appetizers section of the menu. The user interface 305 also presents user-selectable targets 311-314 for the appetizer items in the menu. In this example, the user has selected the user-selectable target 311 for the appetizer "chips and salsa" using pointer 316.

In response to the user selection, the user interface 305 is updated to present content related to chips and salsa over the image of the menu as shown in the screen shot 320. In this example, the content includes a text block 322 that includes information about chips and salsa and images 323 and 324 of chips and salsa. The text block 322 and the images 323 and 324 can be presented over the portion of the image of the menu that was visible in the screen shot 310 such that the selected user-selectable target 311 remains visible. For example, the text block 322 and the images 323 and 324 are presented over the portion of the image that depicts other appetizers while the text for chips and salsa remains visible.

In some implementations, the user interface 305 can be updated by such that a different portion of the image is visible so that the selected text remains visible and the content related to the selected text is presented below the selected text. In some implementations, the visible portion of the image is not changed and the content is presented over a portion of the image that does not include the selected text, e.g., above the selected text or to a side of the selected text.

Figure 4:
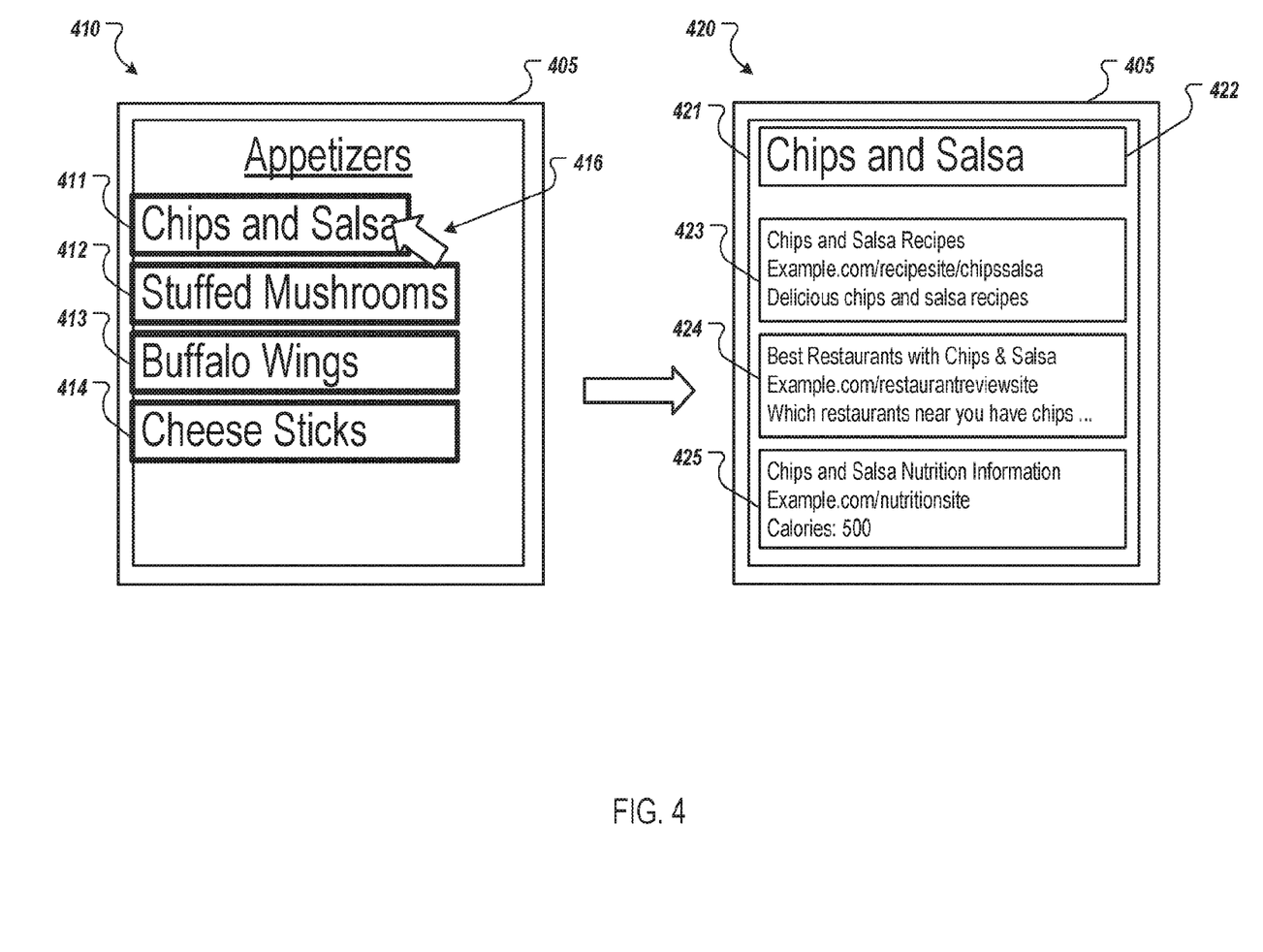
FIG. 4 depicts example screen shots of an example user interface that enables a user to select text and view content related to the selected text.

FIG. 4 depicts example screen shots 410 and 420 of an example user interface 405 that enables a user to select text and view content related to the selected text. The screen shot 410 is similar to the screen shot 230 of FIG. 2. In the screen shot 410, the user interface 405 presents a partial view (e.g., a zoomed in view) of an image of a menu. In particular, the user interface 405 presents the portion of the image that includes the appetizers section of the menu. The user interface 405 also presents user-selectable targets 411-314 for the appetizer items in the menu. The user has selected the user-selectable target 411 for the appetizer "chips and salsa" using pointer 416.

In this example, rather than present content over the image as in the example of FIG. 3, the user interface 405 has been updated to present a search results page 421 as shown in the screen shot 420. The search results page 421 can be used to begin a search based on text selected by a user. For example, the search results page 421 includes a search box 422 that has been populated, e.g., automatically by an image application, with the text "chips and salsa" in response to the user selecting the user-selectable target 411 for the text "chips and salsa." The user can then modify the query in the search box 422 to submit a modified query, such as "chips and salsa nutritional information" and view search results for the modified query on the search results page 421.

The search results page 421 also includes search results 423-425 identified based on the query "chips and salsa." For example, the image application can submit the query to a search engine and present search results received from the search engine on the search results page in response to detecting a selection of the user-selectable target 411. If the user modifies the query and submits the modified query, new search results for the modified query can be presented on the search results page, e.g., in place of the search results 423-425.

Figure 5:
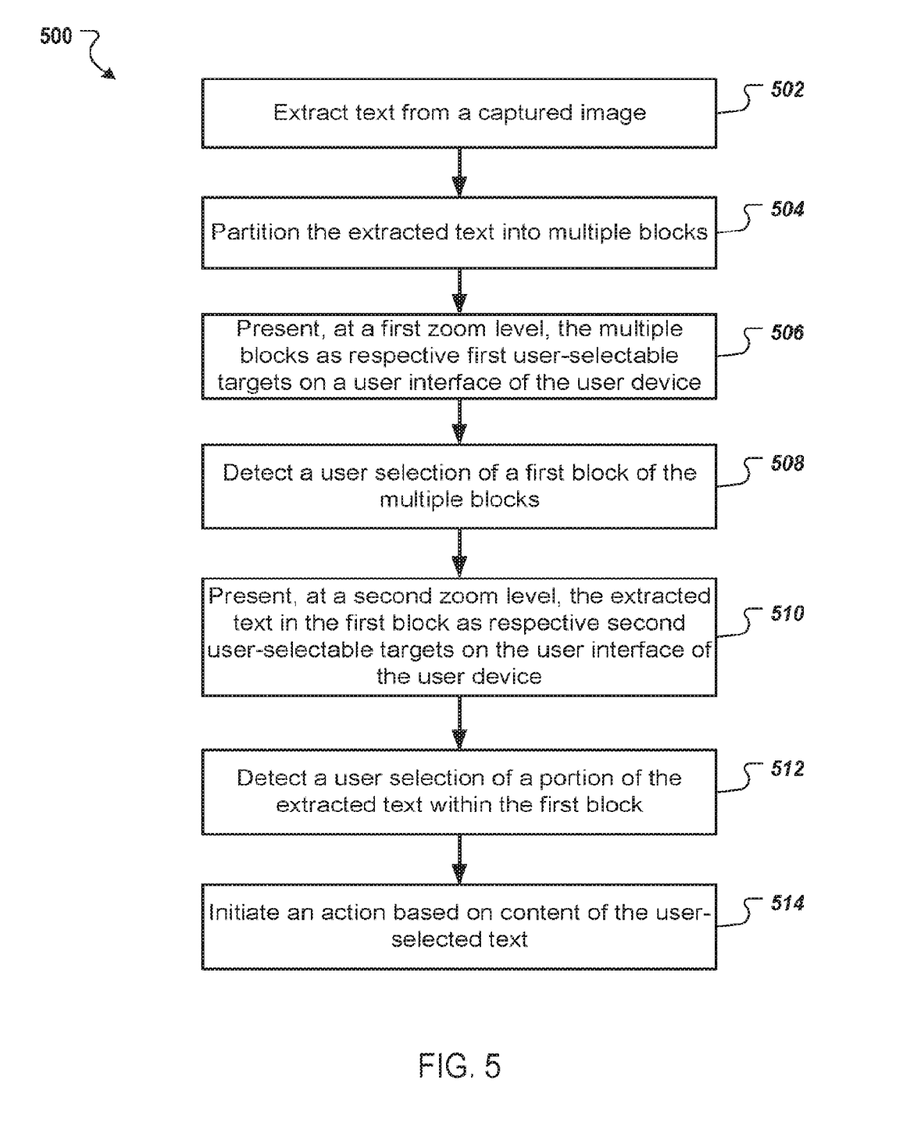
FIG. 5 is a flowchart of an example process for initiating an action based on content of user-selected text.

FIG. 5 is a flowchart of an example process 500 for initiating an action based on content of user-selected text. Operations of the process 500 can be implemented, for example, by a user device that includes one or more data processing apparatus, such as the user device 110 of FIG. 1. The process 500 can also be implemented by instructions stored on a computer storage medium where execution of the instructions by a system that includes a data processing apparatus cause the data processing apparatus to perform the operations of the process 500.

The user device extracts text from a captured image (502). The image may be captured using a camera of the user device, captured by a camera of another device that is sent to the user device, or retrieved from storage. The user device can extract text from the captured image using OCR techniques.

The user device partitions the extracted text into multiple blocks (504). The user device can partition the extracted text into multiple blocks of related text based on the arrangement of the extracted text within the captured image, based on one or more semantic analyses of the extracted text, and/or using other appropriate techniques for identifying groups of related text.

The user device presents the multiple blocks of text as respective first user-selectable targets on a user interface of the user device (506). The user interface can present the multiple blocks as user-selectable targets at a first zoom level, e.g., a default zoom level that shows the entire captured image.

The user device detects a user selection of a first block of the multiple blocks (508). A user can interact with the user-selectable target to select the text. For example, the user can touch a touchscreen of the user device's display at a location of the text or click on the text using a mouse.

In response to the user selection of the text, the user device presents the extracted text in the first block as respective second user-selectable targets on the user interface of the user device (510). For example, the user device can update the user interface to zoom into the first block of text. That is, the user device can display the first block of text at a second zoom level that is greater than the first zoom level. In this way, the text of the first block is larger and easier for the user to select the appropriate text to request content related to the text.

The user device detects a user selection of a portion of the extracted text within the first block of text (512). In response, the user device initiates an action based on content of the selected text (514). The action can vary based on the content of the selected text. For example, if the content of the selected text is a phone number, the action can be to initiate a phone call using the phone number. If the content of the selected text is an address, the action can be to open a map application to the address.

If the content of the selected text is an entity or otherwise does not have a corresponding action, the action can be to request content related to the content of the selected text. For example, the user device can generate one or more search queries based on the content of the selected text and initiate a search using the content of the selected text.

In some implementations, the action can be to display multiple candidate search queries on the user interface to allow the user to select a preferred search query. The candidate search queries can be based on the content of the selected text. For example, the candidate search queries can include the content of the selected text and one or more suggested terms that are related to the content of the selected text. If the user selects one of the candidate queries, the user device can send the query to a search engine and present search results or content related to the selected query on the user interface.

Figure 6:
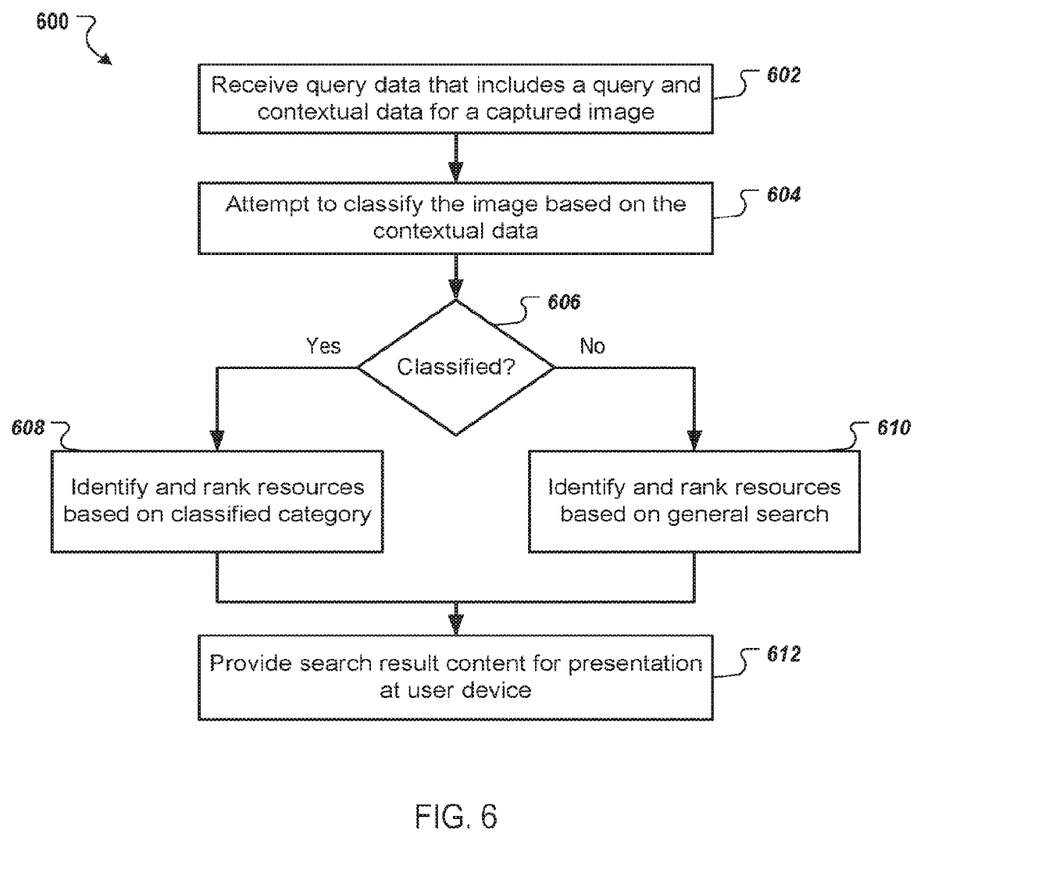
FIG. 6 is a flowchart of an example process for providing content in response to a search query.

FIG. 6 is a flowchart of an example process 600 for providing content in response to a search query. Operations of the process 600 can be implemented, for example, by a system that includes one or more data processing apparatus, such as the search system 150 of FIG. 1. The process 600 can also be implemented by instructions stored on a computer storage medium where execution of the instructions by a system that includes a data processing apparatus cause the data processing apparatus to perform the operations of the process 600.

The system receives query data (602). The query data can include a query and context data for a captured image. The query can include content of text depicted in the image and that was selected by a user. The contextual data can include other text depicted in the image but that was not selected by the user.

The system attempts to classify the image based on the contextual data (604). For example, the system can use one or more machine learning models to attempt to classify the image based on the text of the image included in the contextual data. The output of the machine learning model(s) can be one of a predefined set of categories (e.g., menu, movie, music, sign, etc.) or no classification.

If the system determines that the image belongs to one of the categories, the system identifies and ranks electronic resources (e.g., web pages, images, videos, etc.) based on a combination of the content of the user selected text and the category (608). For example, the system can modify a query that is based on the content of the selected text to include one or more terms based on the identified category. In another example, the system can boost the rank of resources that are related to the category and/or decrease the rank of resources that are not related to the category.

If the system determines that the image does not belong to one of the categories, the system identifies and ranks resources using a general search (610). For example, the system may not modify the query or adjust the ranking of the resources. Instead, the system can identify resources based on the content of the selected text only.

The system provides search result content for presentation at a user device from which the query data was received (612). In some implementations, the search result content can include the resources identified based on the query and optionally the category of the image if the image is classified as belonging to one of the categories. For example, the user device can display the content (e.g., text of a web page, images, an embedded video, or a link to a video) with the image from which the text was selected.

In some implementations, the search result content includes search results for the resources identified based on the query and optionally the category of the image if the image is classified as belonging to one of the categories. For example, the user device can present the search results on a search results page, e.g., in place of the image or over the image.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
extracting, by a user device, text from a captured image;
partitioning, by the user device, the extracted text into multiple blocks;
presenting, by the user device and at a first zoom level, the multiple blocks as respective user-selectable targets on a user interface of the user device;
detecting a user selection of a first block of the multiple blocks;
determining a likelihood one or more words of the first block are to be selected by a user;
in response to detecting the user selection of the first block, presenting, by the user device and at a second zoom level greater than the first zoom level, portions of the extracted text in the first block as respective second user-selectable targets on the user interface of the user device, wherein the respective second user-selectable targets excludes the one or more words of the first block based on the likelihood the one or more words of the first block are to be selected by the user; and
in response to detecting a user selection of a portion of the extracted text within the first block, initiating, by the user device, an action based on the content of the user-selected text; and further comprising, before user selection of one of the blocks:
for at least one block, generating, by the user device, one or more search queries based on the extracted text of the block;
sending the one or more search queries from the user device to a search engine;
receiving, at the user device, search result content from the search engine based on the one or more search queries; and
storing the received search result content in a local memory of the user device;
wherein the user device generates and sends the one or more search queries before presenting the blocks as respective user-selectable targets on the user interface.

2. A method as claimed in claim 1 wherein initiating the action comprises initiating communication to a destination address identified by the user-selected text.

3. A method as claimed in claim 1 wherein initiating the action comprises:
generating, based on the content of the user-selected text, a search query; and
sending, by the user device, the search query to a search engine.

4. A method as claimed in claim 3 and further comprising:
extracting, by the user device, context from the image;
wherein generating the search query or the candidate search queries comprises generating the search query or the candidate search queries further based on the extracted context of the image.

5. A method as claimed in claim 3 and further comprising:
extracting, by the user device, context from the image; and
determining, by the user device, using the extracted context of the image, whether the image falls into one of a plurality of predefined categories;
wherein generating the search query or the candidate search queries comprises generating the search query or the candidate search queries further based on the extracted context if the image falls into one of the predefined categories, otherwise generating the search query or the candidate search queries based only on the content of the user-selected text.

6. The method of claim 3, further comprising displaying, on the user interface, content received at the user device from the search engine.

7. The method of claim 6, wherein displaying, on the user interface, content received at the user device from the search engine comprises displaying the content in a viewport of the user device along with at least a portion of the image.

8. The method of claim 3, further comprising:
extracting, by the user device, context from the image;
determining, using the extracted context of the image, that the image belongs to one of a plurality of predefined categories; and
adjusting the search query based on the extracted context in response to determining that the image belongs to one of the predefined categories.

9. The method of claim 8, further comprising receiving, by the user device and from the search engine, search result content selected based on the search query, wherein the search engine ranks the search results based on the one predefined category to which the image belongs.

10. A method as claimed in claim 1 wherein initiating the action comprises:
generating, based on the content of the user-selected text, two or more candidate search queries;
displaying the candidate search queries on the user interface; and
responsive to user selection of one of the candidate queries, sending, by the user device, the selected candidate query to the search engine.

11. The method as claimed in claim 1, wherein generating the one or more search queries based on the extracted text of the block comprises:
parsing the extracted text of the block into multiple first sets of text at a first level of text-based granularity; and
generating a search query for each first set of text.

12. The method of claim 11 further comprising:
in response to detecting the user selection of the block:
parsing the extracted text of the block into multiple second sets of text at a second level of text-based granularity greater than the first level of text-based granularity; and
prior to receiving the user selection of a portion of the extracted text within the first block:
generating an additional search query for each second set of text;
sending each additional search query from the user device to the search engine;
receiving, by the user device and from the search engine, additional search result content based on the additional search queries; and
storing the additional search result content in local memory of the user device.

13. A method as claimed in claim 1,
wherein partitioning the extracted text into the blocks is based at least partially on semantic analysis of the extracted text.

14. A system comprising:
a data processing apparatus; and
a memory apparatus in data communication with the data processing apparatus and storing instructions executable by the data processing apparatus and that upon such execution cause the data processing apparatus to perform operations comprising:

extracting, by a user device, text from a captured image;

partitioning, by the user device, the extracted text into multiple blocks;

presenting, by the user device and at a first zoom level, the multiple blocks as respective user-selectable targets on a user interface of the user device;

detecting a user selection of a first block of the multiple blocks;

determining a likelihood one or more words of the first block are to be selected by a user;

in response to detecting the user selection of the first block, presenting, by the user device and at a second zoom level greater than the first zoom level, portions of the extracted text in the first block as respective second user-selectable targets on the user interface of the user device, wherein the respective second user-selectable targets excludes the one or more words of the first block based on the likelihood the one or more words of the first block are to be selected by the user; and in response to detecting a user selection of a portion of the extracted text within the first block, initiating, by the user device, an action based on the content of the user-selected text; and further comprising, before user selection of one of the blocks:

for at least one block, generating, by the user device, one or more search queries based on the extracted text of the block;

sending the one or more search queries from the user device to a search engine;

receiving, at the user device, search result content from the search engine based on the one or more search queries; and storing the received search result content in a local memory of the user device;

wherein the user device generates and sends the one or more search queries before presenting the blocks as respective user-selectable targets on the user interface.

15. The system of claim 14, wherein initiating the action comprises initiating communication to a destination address identified by the user-selected text.

16. The system of claim 14, wherein initiating the action comprises:

generating, based on the content of the user-selected text, a search query; and sending the search query to a search engine.

17. The system of claim 16, wherein the operations further comprise:

extracting context from the image;

determining, using the extracted context of the image, that the image belongs to one of a plurality of predefined categories; and adjusting the search query based on the extracted context in response to determining that the image belongs to one of the predefined categories.

18. A non-transitory computer-readable storage medium having instructions stored thereon, which, when executed by a data processing apparatus, cause the data processing apparatus to perform operations comprising:

processing a captured image with a context classifier to determine a category of the image;

extracting, by a user device, text from the captured image;

partitioning, by the user device, the extracted text into multiple blocks;

presenting, by the user device and at a first zoom level, the multiple blocks as respective user-selectable targets on a user interface of the user device;

detecting a user selection of a first block of the multiple blocks;

determining a likelihood one or more words of the first block are to be selected by a user;

in response to detecting the user selection of the first block, presenting, by the user device and at a second zoom level greater than the first zoom level, portions of the extracted text in the first block as respective second user-selectable targets on the user interface of the user device, wherein the respective second user-selectable targets excludes the one or more words of the first block based on the likelihood the one or more words of the first block are to be selected by the user; and in response to detecting a user selection of a portion of the extracted text within the first block, initiating, by the user device, an action based on the content of the user-selected text and the category; and further comprising, before user selection of one of the blocks:

for at least one block, generating, by the user device, one or more search queries based on the extracted text of the block and the category;

sending the one or more search queries from the user device to a search engine;

receiving, at the user device, search result content from the search engine based on the one or more search queries; and storing the received search result content in a local memory of the user device;

wherein the user device generates and sends the one or more search queries before presenting the blocks as respective user-selectable targets on the user interface.

19. The system of claim 18, wherein initiating the action comprises initiating communication to a destination address identified by the user-selected text.

20. The system of claim 18, wherein initiating the action comprises:

generating, based on the content of the user-selected text, a search query; and sending the search query to a search engine.

* * * * *